(12) United States Patent
Gregory et al.

(10) Patent No.: US 8,992,137 B2
(45) Date of Patent: Mar. 31, 2015

(54) COOLANT ADAPTER

(76) Inventors: Jason Nicholas Gregory, Bath (GB);
Christopher John Dewfall, Bristol
(GB); Clive Jenkin Evans, Bristol (GB);
Mark Stephen Pimble, Bristol (GB);
Richard John Pitman, Bristol (GB);
Timothy David Bond, Bristol (GB)

( * ) Notice: Subject to any disclaimer, the term of this
patent is extended or adjusted under 35
U.S.C. 154(b) by 309 days.

(21) Appl. No.: 13/504,407

(22) PCT Filed: Oct. 26, 2010

(86) PCT No.: PCT/EP2010/066201
§ 371 (c)(1),
(2), (4) Date: Aug. 14, 2012

(87) PCT Pub. No.: WO2011/051306
PCT Pub. Date: May 5, 2011

(65) Prior Publication Data
US 2012/0298214 A1    Nov. 29, 2012

(30) Foreign Application Priority Data
Oct. 28, 2009   (GB) .................................. 0918978.8

(51) Int. Cl.
*B23Q 11/10*   (2006.01)
*B23Q 1/00*    (2006.01)
*B23Q 5/04*    (2006.01)
(52) U.S. Cl.
CPC .............. *B23Q 11/10* (2013.01); *B23Q 11/103*
(2013.01); *Y10T 279/17111* (2013.01); *Y10T
408/45* (2013.01); *B23Q 1/0036* (2013.01);
*B23Q 5/043* (2013.01)
USPC ............................................ 408/57; 279/20

(58) Field of Classification Search
CPC .. B23Q 11/103; B23Q 11/10; B23Q 11/1015;
B23Q 1/0036; B23Q 5/043
USPC .......... 408/56, 57, 59; 279/20, 43.9, 46.9, 52,
279/42
See application file for complete search history.

(56) References Cited

U.S. PATENT DOCUMENTS 2,777,702 A * 1/1957 Rodal .............................. 279/20
3,024,030 A * 3/1962 Koch ............................... 279/20
4,570,952 A * 2/1986 Heimbigner et al. ........... 279/20
4,648,759 A * 3/1987 Ebenhoch ....................... 408/59

(Continued)

OTHER PUBLICATIONS

International Search Report for International Application PCT/
EP2010/066201, dated Feb. 3, 2011.

*Primary Examiner* — Daniel Howell
*Assistant Examiner* — Nicole N Ramos
(74) *Attorney, Agent, or Firm* — Crose Law LLC; Bradley D.
Crose

(57) ABSTRACT

The invention relates to an adapter for driven tools such as
drilling or milling tools, for adapting an externally fed driven
tool for use in a thru coolant system comprising: a) a cylindrical inner sleeve, b) an outer sleeve adapted to rotate relative
to the inner sleeve, c) a delivery pipe to deliver coolant to the
outer sleeve, and d) at least one coolant flow channel through
the outer sleeve and through the inner sleeve to allow flow of
coolant from the delivery pipe to the collet, and e) a seal at one
end of the inner sleeve having an aperture to receive the
cutting tool whereby to allow the blunt end of the tool to
engage the collet, in use coolant can pass through the outer
sleeve, through the inner sleeve into the collet, and to the
cutting tool whilst said inner sleeve rotates with said machine
output spindle and the outer sleeve remains static.

5 Claims, 2 Drawing Sheets

(56) References Cited

U.S. PATENT DOCUMENTS

| | | | |
|---|---|---|---|
| 4,708,538 A | 11/1987 | Kubo et al. | |
| 4,770,570 A * | 9/1988 | Tsui et al. | 408/61 |
| 4,841,817 A | 6/1989 | Tsui et al. | |
| 4,850,755 A * | 7/1989 | Spencer | 408/56 |
| 4,890,963 A * | 1/1990 | Keritsis | 408/59 |
| 5,037,250 A * | 8/1991 | Kenny | 408/57 |
| 5,601,386 A * | 2/1997 | Wells | 408/57 |
| 5,697,739 A * | 12/1997 | Lewis et al. | 409/230 |
| 5,752,706 A * | 5/1998 | Hodges | 279/16 |
| 6,939,094 B2 * | 9/2005 | Konishi | 409/230 |
| 7,563,062 B1 * | 7/2009 | Chen | 409/230 |
| 2002/0119019 A1 * | 8/2002 | Hara | 409/131 |
| 2006/0120817 A1 * | 6/2006 | Huang | 409/137 |

* cited by examiner

COOLANT ADAPTER

RELATED APPLICATIONS

This application is a national stage filing under 35 U.S.C. 371 of International Application PCT/EP2010/066201, filed Oct. 26, 2010, which claims priority to, and the benefit of, United Kingdom Application No. 0918978.8, filed on Oct. 28, 2009. The entire contents of International Application No. PCT/EP2010/066201 are incorporated herein by reference. International Application PCT/EP2010/066201 was published under PCT Article 21 (2) in English.

The present invention relates to an adapter for driven tools such as drilling or milling tools.

It is common practice to use a turret supporting several driven tools, with each driven tool supporting a cutting tool (e.g. a drilling or milling tool). The turret rotates so that different driven tools are presented to the work piece so different parts of the work piece can be drilled and/or milled. The present invention can also be utilised on a single spindle milling machine.

Coolant is delivered to the cutting edge of the cutting tool to try and keep the cutting edge and work piece cool during cutting and so extend the cutting tool edge and driven tool life. Coolant also helps prevent thermal transfer affecting the component, and enables cutting to be performed at higher speeds thus reducing production times. Coolants can be liquids or gasses such as air.

Conventional driven tools fall into two broad categories depending on how coolant is delivered to the cutting edge.

Externally-fed driven tools are so described because coolant is delivered to the cutting edge by a coolant pipe which is mounted on the external body of the driven tool. These systems are reliant on the machine operator focusing the flow of coolant accurately by hand at the cutting edge.

This is not an ideal situation as the coolant does not always reach the tip of the cutting edge. As a result the cutting tool can wear prematurely. Cutting edge wear can cause heat transfer, which can cause hardening and/or distortion of the work piece.

The main alternative to externally fed coolant tools is specialized "thru coolant" driven tooling and cutting tools which transfer coolant through the spindle of the driven tool and into the rear of the cutting tool, coolant is then transferred to the cutting edge via coolant conduits in the cutting tool.

"Thru coolant" driven tooling can be expensive to purchase and requires a special sealing system to prevent coolant entering the bearings of the driven tool. These seals have a limited life and on failing flood the tool with coolant damaging the bearings eventually causing tool failure.

A need exists for a means of improving the accuracy of the delivery of coolant to the cutting edge by conventional externally fed driven tools.

According to the present invention there is provided an adapter for adapting an externally fed driven tool for use in a thru coolant system comprising:
a) a cylindrical inner sleeve having an internal thread to engage with the external thread of a driven tool machine output spindle, said inner sleeve having a recess to receive a collet to engage with a cutting tool,
b) an outer sleeve adapted to rotate relative to the inner sleeve,
c) a delivery pipe to deliver coolant to the outer sleeve, and
d) at least one coolant flow channel through the outer sleeve and through the inner sleeve to allow flow of coolant from the delivery pipe to the collet, and e) a seal at one end of the inner sleeve having an aperture to receive the cutting tool whereby to allow the blunt end of the tool to engage the collet, in use coolant can pass through the outer sleeve, through the inner sleeve into the collet, and to the cutting tool whilst said inner sleeve rotates with said machine output spindle and the outer sleeve remains static.

In a preferred aspect the internal thread engages with the external thread of a conventional driven tool machine output spindle.

In a further aspect coolant flows to the cutting edge of the cutting tool through internal coolant conduits.

In an alternative aspect the seal is a removable seal which, once removed, allows flow of coolant from the or each inner sleeve flow channels onto the outside of the cutting tool.

In a further aspect the inner sleeve recess includes an annular flange to releasably engage with an annular recess on the collet.

In a further aspect the delivery pipe comprises a flexible pipe which prior to use can be shortened to fit the driven tool to be adapted.

An embodiment of the invention will now be described with reference to the accompanying drawings in which.

Figure 1:
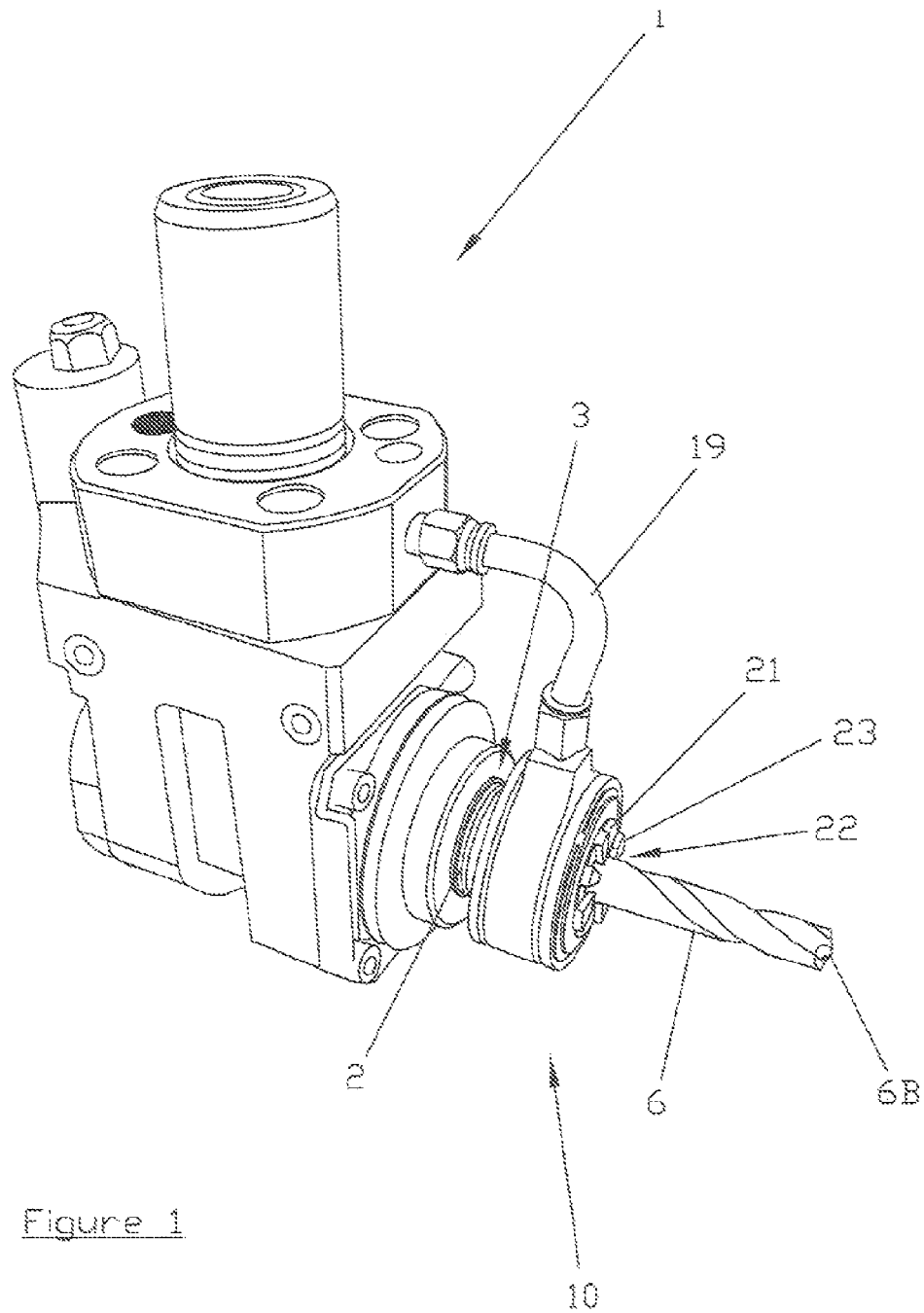
FIG. 1 shows a perspective view of a coolant adapter on a driven tool.
Figure 2:
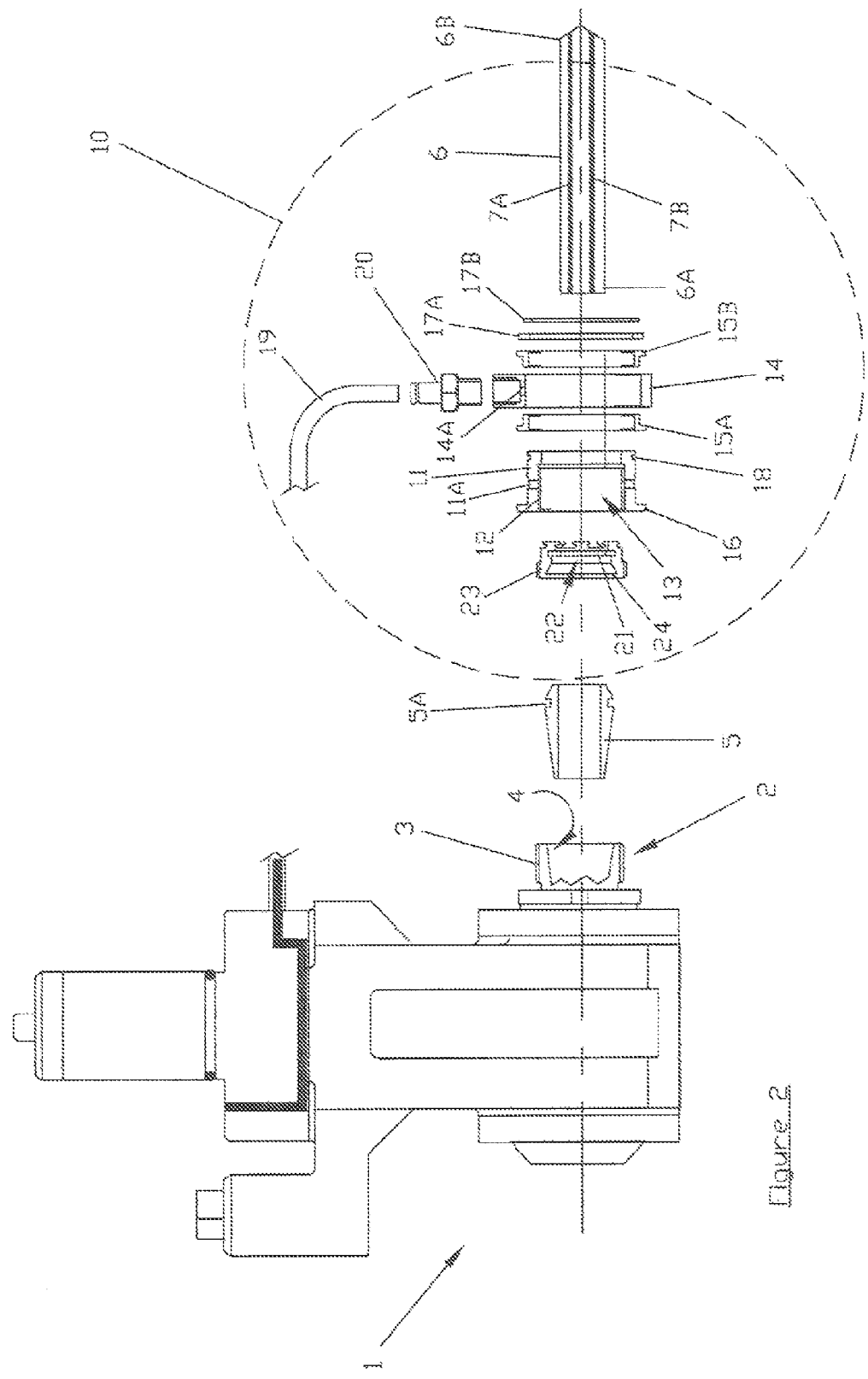
FIG. 2 shows a cross section view of the coolant adapter on the driven tool of FIG. 1.

Referring to the drawings there is shown coolant adapter 10 on a driven tool 1.

Driven tool 1 has a machine output spindle 2 with an external thread 3. Spindle 2 has tapered recess 4 to receive a tapered collet 5. Collet 5 is adapted to receive and engage with a cutting tool, such as the blunt end 6A of a drilling tool 6 with a cutting end 6B. Cutting tool 6 has conduits 7A,7B along its length between its cutting end 6B and blunt end 6A to receive coolant. Spindle 2, collet 5 and cutting tool 6 are of a type well known in the art.

Adapter 10 according to the invention has a cylindrical inner sleeve 11 having an internal thread 12 to engage with the external thread 3 of machine output spindle 2. Inner sleeve 11 has a recess 13 receive collet 5.

An outer sleeve 14 is adapted to rotate relative to the inner sleeve 11. In use the outer sleeve 14 remains static whilst the inner sleeve rotates inside it. Outer sleeve 14 is sealed against inner sleeve 11 by means of a pair of opposing seal bushes 15A,15B which are retained on the inner sleeve between sleeve end flange 16 and spacer 17A and circlip 17B. Circlip 17B sits in an annular groove 18 on inner sleeve 11.

A delivery pipe 19 delivers coolant through a connector 20 to the outer sleeve 14 from the driven tool 1. It also prevents rotation of the outer sleeve 14. At least one coolant flow channel 14A is provided through the outer sleeve 14 and at least one coolant flow channel 11A is provided through the inner sleeve 11 to allow flow of coolant from the delivery pipe 19 to the collet 5.

A seal 21 is supported in a clamping nut 23 at the end of the inner sleeve remote from the driven tool. Seal 21 has an aperture 22 to receive and seal around the cutting tool 6 whereby to allow the blunt end of the tool to pass through the coolant adapter and engage the collet. Clamping nut 23 in the inner sleeve recess 13 includes an annular flange 24 to releasably engage with an annular recess 5A on the collet. Rotation of clamping nut 23 rotates inner sleeve 11 so that it screws onto spindle 2 external thread 3 so compressing collet 5 to secure the tool 6 on the spindle 2.

In use coolant can pass from the delivery pipe 19 through the outer sleeve 14, through the inner sleeve 11 into the collet 5, and through the cutting tool 6 from the blunt end 6A to the tool cutting end 6B whilst the inner sleeve 11 rotates with the machine output spindle 2 and the outer sleeve 14 remains static.

The adapter of the invention can be retro fitted to existing, conventional externally fed driven tools, to accurately deliver coolant to the cutting tool edge.

In a preferred aspect the adapter can be used to deliver coolant to the internal coolant conduits of a cutting tool which has conventionally been used with thru coolant driven tools, from where it flows through the cutting tool to the cutting edge.

Preferably the seal 21 is a removable seal which, once removed, allows flow of coolant from the or each inner sleeve flow channels onto the outside of the cutting tool rather than through the cutting tool. This allows the adapter to be used with cutting tools which do not have internal coolant conduits. The adapter delivers coolant accurately to the external surface of a cutting tool from where it flows along the shaft to the cutting edge.

Preferably the coolant delivery pipe is formed of a flexible material which can easily be cut to length and joined to the driven tool using a push fitting. Optionally the delivery pipe has a reinforcing metal casing to strengthen and protect it.

Suitable coolants include liquids such as by way of example only semi-synthetic coolants, synthetic coolants, oil/water mixtures, or mineral oil or gasses such as air.

The invention claimed is:

1. An adapter for adapting an externally fed driven tool for use in a thru coolant system comprising:
   a) a collet for receiving and engaging a tool;
   b) a clamping nut for compressing the collet;
   c) a cylindrical inner sleeve having an internal thread to engage with an external thread of a driven tool machine output spindle, said inner sleeve having a recess in which the collet and the clamping nut are internally received, such that by engagement of the inner sleeve with the external thread of the driven tool machine output spindle the collet is compressed onto the tool, and the inner sleeve is arranged at the end of the collet distal from the output spindle;
   d) an outer sleeve provided around the inner sleeve and adapted to rotate relative to the inner sleeve,
   e) a delivery pipe to deliver coolant to the outer sleeve,
   f) at least one coolant flow channel through the outer sleeve and at least one coolant flow channel through the inner sleeve to allow flow of coolant from the delivery pipe to the collet, and
   g) a removable seal at one end of the inner sleeve having an aperture to receive the cutting tool whereby to allow a blunt end of the tool to engage the collet;
   whereby, in use, coolant is directed through the outer sleeve, through the inner sleeve into the collet, and to the cutting tool whilst said inner sleeve rotates with said machine output spindle and the outer sleeve remains static.

2. The adapter according to claim 1 arranged to direct coolant through internal coolant conduits located in an engaged tool.

3. The adapter according to claim 1 arranged such that removal of the seal directs coolant from the at least one coolant flow channel through the inner sleeve onto the outside of the cutting tool.

4. The adapter according to claim 1 wherein the clamping nut includes an annular flange to releasably engage with an annular recess on the collet.

5. The adapter according to claim 1 wherein the delivery pipe comprises a flexible pipe which prior to use is shortenable to fit the driven tool to be adapted.

* * * * *